(12) United States Patent
Banner

(10) Patent No.: US 12,330,967 B1
(45) Date of Patent: *Jun. 17, 2025

(54) COMPOSITIONS AND METHODS FOR REDUCTION OF FREE CHLORINE AND RELATED ODOR

(71) Applicant: Swamp Fox Innovations, LLC, Ames, IA (US)

(72) Inventor: Larry Todd Banner, Ames, IA (US)

(73) Assignee: Swamp Fox Innovations, LLC, Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,908

(22) Filed: Jan. 24, 2023

Related U.S. Application Data

(63) Continuation of application No. 16/899,227, filed on Jun. 11, 2020, now Pat. No. 11,572,295.

(60) Provisional application No. 62/860,042, filed on Jun. 11, 2019.

(51) Int. Cl.
*C02F 1/70* (2023.01)
*C02F 101/12* (2006.01)

(52) U.S. Cl.
CPC ............ *C02F 1/70* (2013.01); *C02F 2101/12* (2013.01); *C02F 2303/02* (2013.01)

(58) Field of Classification Search
CPC ...................................................... C02F 1/70
See application file for complete search history.

(56) References Cited

U.S. PATENT DOCUMENTS

| | | | |
|---|---|---|---|
| 2005/0153030 A1* | 7/2005 | Young | A23L 2/38 426/330.2 |
| 2007/0199875 A1 | 8/2007 | Morrey et al. | |
| 2008/0166365 A1 | 7/2008 | Ravetti | |
| 2010/0212262 A1 | 8/2010 | Townsend | |
| 2017/0022077 A1 | 1/2017 | Kareis | |
| 2017/0320763 A1 | 11/2017 | Noland | |
| 2019/0105404 A1* | 4/2019 | Pipkin | A61K 9/0078 |
| 2021/0002152 A1* | 1/2021 | Rosenblatt | C02F 1/76 |

OTHER PUBLICATIONS

Bach et al., "Associations Between Nondietary Factors and Dairy Herd Performance", Journal of Dairy Science, Aug. 1, 2008, pp. 3259-3267, vol. 91, No. 8.
Beede, "Assessment of Water Quality and Nutrition for Dairy Cattle", Proc: Mid-South Ruminant Nutrition Conference,, Apr. 27, 2005, Published in: Arlington, TX.
Exon et al., "Immunotoxicologic Evaluation of Chlorine-Based Drinking Water Disinfectants, Sodium Hypochlorite and Monochloramine", Toxicology, Jan. 1, 19987, pp. 257-269, vol. 44.
Beckett Corp, "Fuel Addtives", 2021, Publisher: https://www.beckettcorp.com/product/fuel-additives.
Langdon et al., "The Effects of Antibiotics On the Microbiome Thoughout Development and Alternative Approaches for Therapeutic Modulation", Genome Medicine, Apr. 13, 2016, pp. 1-16, vol. 8, No. 39.
Olkowski, "Livestock Water Quality. A Field Guide For Cattle, Horses, Poultry, and Swine", Agriculture and Agri-Food Canada, May 1, 2009, pp. 1-181, Publisher: University of Saskatchewan.
Pour Point Suppressant, "Pri-Flow", 2022.
Tofant et al., "Association Between Over-Chlorinated Drinking Water and Adverse Reproductive Outcomes in Gilts and Sows: A Case Report", Veterinarni Medicina, Aug. 30, 2010, pp. 394-398, vol. 55, No. 8.
Tofant et al., "Association Between Over-Chlorinated Drinking Water and Suckling, Nursery, and Fattening Pig Death Losses", Veterinarni Medicina, Jul. 29, 2011, pp. 358-361, vol. 56, No. 7.

* cited by examiner

*Primary Examiner* — Chester T Barry
(74) *Attorney, Agent, or Firm* — Dentons Davis Brown; Matthew Coryell

(57) ABSTRACT

The disclosed embodiments relate to a composition for the dechlorination of water and improving the palatability of chlorinated water for livestock. In certain aspects, disclosed compositions comprise a pour point suppressant; a reducing agent; a weak base, and water. Further disclosed are method for dechlorinating chlorinated water comprising combing a dechlorinating solution with chlorinated water, wherein the dechlorinating solution comprises a pour point suppressant; a reducing agent; a weak base, and water.

20 Claims, No Drawings

COMPOSITIONS AND METHODS FOR REDUCTION OF FREE CHLORINE AND RELATED ODOR

CROSS-REFERENCE TO RELATED APPLICATION(S)

This application is a continuation application of U.S. application Ser. No. 16/899,227, filed on Apr. 2, 2019, now issued as U.S. Pat. No. 11,572,295, and entitled "IMPROVED COMPOSITIONS AND METHODS FOR REDUCTION OF FREE CHLORINE AND RELATED ODOR," which claims priority to U.S. Provisional Application No. 62/860,042 filed Jun. 11, 2019, and entitled "IMPROVED COMPOSITIONS AND METHODS FOR REDUCTION OF FREE CHLORINE AND RELATED ODOR," which is hereby incorporated by reference in its entirety under 35 U.S.C. § 119(e).

TECHNICAL FIELD

The disclosed technology relates generally to compositions and methods for the reduction of free chlorine and related odor from drinking water for livestock.

BACKGROUND

The disclosure relates to compositions and methods for treatment of liquids such as water for use in livestock, equine, and house hold pet applications. When farm-raised livestock are introduced to chlorine containing municipal water, often at livestock fairs or exhibitions, they often will not drink the water. In some cases, the animal may not drink the water for several days leading to animal dehydration. It is understood that not only is this bad for the animal health, but it also reduces the show appeal of animal at the exhibition. In extreme situations, the exhibitor may force-feed water to the animal. Prior approaches to reduce chlorination levels of municipal water sources for livestock consumption have utilized filters attached to the end of a house. However, the dechlorination capacity of these filters is quickly exhausted, limiting their utility for larger volumes of water. As a result of the insufficiency of available dechlorination options, it is common for exhibitors to haul water tanks long distances at substantial cost to ensure their animals will have palatable water at exhibition sites. Accordingly, there is a need in the art for compositions and methods to increase the palatability of chlorinated water.

BRIEF SUMMARY

Described herein are various embodiments relating to compositions and methods for treatment of drinking water, particularly for livestock.

In certain aspects, disclosed is a liquid composition for treatment of chlorinated liquid that comprises glycerin, a reducing agent, a weak base and water. In according to certain embodiments, glycerin is present in an amount from about 55% to about 85% of the composition volume. In further embodiments, the composition comprises about 70% glycerin, about 4.5% reducing agent, about, 0.5% weak base, and about 25.0% water. According the further embodiments, the composition comprises about 70% glycerin, about 0.8% reducing agent, about 0.5% weak base, and about 28.7% water. In further embodiments, the glycerin has a fatty acid and ester content of about 0.5 or less and the weak base in present in an amount from about 0.3% to about 0.5%.

According to certain implementations, the weak bases is chosen from one or more of sodium citrate, sodium tartrate, sodium lactate, sodium ascorbate, sodium malate, sodium benzoate, sodium sorbate, sodium propionate, and sodium phosphate. In certain exemplary implementations, the weak base is sodium citrate. In certain aspects of these implementations, the sodium citrate is present from about 0.1% to about 1.0%. In further aspects, the sodium citrate is present at about 0.5%.

In certain implementations, the reducing agent is selected from a list including of sodium thiosulfate pentahydrate, potassium thiosulfate, calcium thiosulfate, magnesium thiosulfate, and salts of thiosulfuric acid. According to certain further implementations, the reducing agent is sodium thiosulfate pentahydrate.

Further disclosed herein is a method of increasing livestock palatability for chlorinated water, that comprises providing a dechlorinating solution comprising glycerin, a reducing agent, a weak base, and water; and the dechlorinating solution with chlorinated water. In certain aspects, the method further comprises the step of assessing the level chlorine in the chlorinated water, following the addition of the dechlorinating solution. In exemplary aspects, the chlorine level is assessed by way of a test strip. In further exemplary aspects, the chlorine is undetectable by the test strip following the addition of the dechlorinating solution.

According to further implementations, the molar ratio of the reducing agent to chlorine in the chlorinated water is about 1:2.

According to certain embodiments, the dechlorinating solution comprises the glycerin present in an amount from about 55% to about 85% of the composition volume. In further embodiments, the dechlorinating solution comprises about 70% glycerin, about 4.5% reducing agent, 0.1% to about 1.0% weak base, and from about 24.5 to about 25.4% water. In yet further embodiments, the dechlorinating solution comprises about 70% glycerin, about 0.8% reducing agent, 0.5% weak base, and about 28.7% water.

Further disclosed herein is a liquid dechlorinating composition for increasing the livestock palatability of chlorinated water that comprises about 70% glycerin, about 0.8% sodium thiosulfate pentahydrate; about 0.5% sodium citrate; and about 28.7% water.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

As used herein, the singular forms "a," "an," and "the" include plural referents unless the context clearly dictates otherwise. Thus, for example, reference to "an active component" refers to one or mixtures of active components, and reference to "the method for" includes reference to equivalent steps and methods known to those skilled in the art, and so forth.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

It was hypothesized that a major reason farm-raised animals do not like municipal water is due to the chlorination treatment of the water. As used herein, "livestock palatability" means the propensity of livestock to consume a substance. Thus, to increase, or improve livestock palatability for chlorinated water, the disclosed compositions and methods increase the propensity or affinity of livestock such water following treatment.

The disclosed composition for a dechlorinating solution and related methods of use reduce the chlorine concentration in liquids, such as water. In various implementations, a dechlorinating solution comprising a pour point suppressant, a reducing agent, and water are provided, which can be mixed and combined with chlorinated drinking water to reduce the chlorination of that drinking water. This reduction can improve the odor and taste of municipal drinking water, such as for livestock. When farm-raised livestock are introduced to chlorine containing municipal water, often at livestock fairs or exhibitions, they often will not drink the water. In some cases, the animal may not drink the water for several days leading to animal dehydration. It is understood that not only is this bad for the animal health, but it also reduces the show appeal of animal at the exhibition. In extreme situations, the exhibitor may force-feed water to the animal.

According to certain implementations, the dechlorinating composition comprises glycerin, a reducing agent, a weak base and water. In certain embodiments, the disclosed composition is formulated to have a low pour point (<−12 C) and combined with a sweetener (to further improve taste and odor of the drinking water). Various implementations are described herein.

Accordingly, various implementations of the composition include a pour point suppressant. In certain aspects, the pour point suppressant provides sweetening taste properties. In various implementations, the pour point suppressant is a polyol, such as a food or feed grade polyol, such as glycerin or glycerol. In various implementations, it is USP glycerin or food grade USP glycerin. It is understood that other examples include crude glycerin, crude glycerin derived as a byproduct of biodiesel manufacture, corn syrup, high fructose corn syrup, dextrose/glucose, maltose, sorbitol, erythritol, maltitol and other pour point suppressants known to one of skill in the art.

According to certain implementations, where the pour point suppressant is glycerin, the composition further comprises a weak base. The inventor has observed that glycerin containing compositions overtime may develop a sulfur odor. The development of this sulfur odor tends to correspond to decreasing pH of the composition. Without wishing to be bound to any particular theory, it is hypothesized that low levels of esters present in some preparations of glycerin are hydrolyzed overtime and result in the acid-based degradation of sulfur containing reducing agents (described further below), giving rise to the observed sulfur odor. The inventor has found that the addition of a weak base to the composition mitigates the time-dependent pH drops and prevents the formation of sulfur odor. The addition of a weak base thus increases the shelf stability of glycerin containing dechlorination compositions.

In further implementations, where the pour point suppressant is glycerin, the glycerin contains less than about 1.0 fatty acid and esters. As described herein, the content of glycerin fatty acid esters are expressed in mL of 0.5N NaOH/50 g. To determine this value, 50 g of glycerin is mixed with 50 mL of freshly boiled water and 5 mL of 0.5 N sodium hydroxide VS, and the mixture is boiled for 5 minutes, and cooled. Phenolphthalein TS is added the excess alkali is titrated with 0.5 N hydrochloric acid VS. A blank determination it performed to establish that not more than 1 mL of 0.5 N sodium hydroxide is consumed. Additional information for establishing the glycerin fatty acid and esters content is found in the United States Pharmacopeial Convention Glycerin monograph, revised 2009, which is hereby incorporated by reference for all purposes. In further implementations, the glycerin contains 0.5 or less fatty acid and esters (e.g., from 0.3 to about 0.5 fatty acid and esters). In exemplary implementations, where fatty acid and ester content of the glycerin is 0.5 or less, the reducing agent is present at an amount of between 0.3% and 0.5%. Without wishing to be bound to any particular theory, it is believed that dechlorination solution containing glycerin with a fatty acid and ester content of 0.5 or below remains stable (e.g. does not form sulfur containing compounds) with a lower reducing agent concentration than a dechlorination solution containing glycerin having higher fatty acid and ester levels.

In certain aspects, the weak base is a salt of an organic acid. In certain implementations, the weak base is chosen from a group of at least one of sodium citrate, sodium tartrate, sodium lactate, sodium ascorbate, sodium malate, sodium benzoate, sodium sorbate, sodium propionate, sodium phosphate and disodium phosphate. In further implementations, the weak base is a mixture of two or more of the foregoing weak bases.

According to certain implementations, the amount of the weak base is sufficient to maintain the pH of the composition at or above a pH of about 7.0. According to certain implementations of these embodiments, the weak base is present in a range from about 0.1% to about 1.0%. In further exemplary embodiments, the weak base is present in an amount of about 0.5%. In still further exemplary embodiments, the amount of weak base added to the composition has a corresponding decrease in the amount of water in the composition.

Various implementations of the composition include a reducing agent. In certain aspects, an agent that reduces hypochlorite or reduces free chlorine is provided. In various implementations, the reducing agent is sodium thiosulfate, including hydrates of sodium thiosulfate. The reducing agent is food and feed grade in certain implementations, such as food grade USP sodium thiosulfate pentahydrate. It is understood that other examples include potassium thiosulfate, calcium thiosulfate, magnesium thiosulfate, salts of thiosulfuric acid, other hydrates of sodium thiosulfate and other reducing agents known to one of skill in the art.

Various implementations may also contain agents to reduce chloramines.

In various implementations, the dechlorinating solution comprises about 70% pour point suppressant, such as glycerin, 0.8% reducing agent, such as sodium thiosulfate pentahydrate, and about 29.2% water.

In various implementations, the pour point suppressant can be provided at about 65% to about 70% of the total volume. In further implementations, the pour point suppressant can be provided at about 55% to about 85% of the total. In yet further implementations, the pour point suppressant can be provided at any concentration above about 5% of the total volume.

It has been observed that in certain examples at about room temperature, ranges below about 65% glycerin the product will not be stable to microbial growth; while those above about 90% become too viscous to pour; 70% pour point suppressant has been found to be one suitable concentration for reduced pour point. It has been observed that the freezing point of 70% glycerin in water is about −41.5° C. and the flowability is at least −12° C., the temperature of a freezer. Those of skill in the art would appreciate that in various ambient temperatures and pressures, alternate formulations will be possible.

According to certain implementations, the composition is formulated such that water activity of the composition is less than about 0.7($a_w$). According to further embodiments, the composition is formulated such that water activity of the composition is less than about 0.6 ($a_w$). According to certain alternative embodiments, water activity is higher than 0.7 ($a_w$). In exemplary implementations of these embodiments, pH ranges from about 5.5 and about 7.0 and water activity ranges from about 0.7 to about 0.85($a_w$). In further implementations, the pH ranges from about 6.0 to about 7.0.

In various implementations, the reducing agent—such as sodium thiosulfate pentahydrate—can be provided at about 0.1% to about 10.0% of the total volume. In further implementations, the reducing agent can be provided at about 0.025% to about 70.0% of the total.

In certain embodiments, the disclosed dechlorination composition is shelf stable. As used herein, the term shelf stable means substantially free of sulfur odor (e.g. there has been little to no degradation of sodium thiosulfate) and substantially free of microbial growth. In certain embodiments, the disclosed composition is shelf stable for from about 3 to about 6 months. In further embodiments, the composition is shelf stable for from about 2 to about 3 years.

In certain implementations, shelf stability of the composition is indicated by a pH of about 8.3 measured about 24 hours after the composition is mixed. In these embodiments, it is understood that while pH may drop below 8.3 after the first 24 hour period (often stabilizing at about 7.0) a pH of 8.3 after about 24 hours post-mixing is an indicator that the composition will be shelf stable.

Further disclosed herein is a method of increasing livestock palatability for chlorinated water, that comprises providing a dechlorinating solution comprising glycerin, a reducing agent, a weak base, and water; and the dechlorinating solution with chlorinated water. In certain aspects, the method further comprises the step of assessing the level chlorine in the chlorinated water, following the addition of the dechlorinating solution. In exemplary aspects, the chlorine level is assessed by way of a test strip. In further exemplary aspects, the chlorine is undetectable by the test strip following the addition of the dechlorinating solution.

According to certain implementations of the disclosed methods, after the dechlorinating solution is prepared, it can be applied to chlorinated water such that the molar ratio of reducing agent to the chlorinating substance is about 1:2. That is, in these exemplary implementations, the reducing agent (such as thiosulfate) can be added at about a molar ratio of about 1:2 (for example sodium thiosulfate:sodium hypochlorite—the typical chlorinating substance for drinking water). In alternate implementations, the molar ratio could be as low as about 1:4 or lower. Further implementations can use higher molar ratios, for example up to a ratio of about 25:1. In Examples 1 and 2 described below, the final molar ration is about 1:2.

It is understood that in these implementations that the free chlorine in the water is assumed to be no higher than about 4 ppm, as is the industry-standard maximum. It is further understood that in certain implementations, chlorination can be as high as about 10 ppm or more, and in these implementations, additional reducing agent would be required, as would be readily appreciated.

In certain implementations, the compositions disclosed herein are suitable for use with livestock and increase livestock palatability of chlorinated water. In further implementations, the compositions disclosed herein are suitable for use with horses and increase horse palatability of chlorinated water. In still further implementations, compositions disclosed herein are suitable for use with household pets and increase household pet palatability of chlorinated water. In yet further implementations, compositions disclosed herein are suitable for use by humans and increase human palatability of chlorinated water.

EXPERIMENTAL EXAMPLES

The following examples are put forth so as to provide those of ordinary skill in the art with a complete disclosure and description of how the articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

In one exemplary implementation, a dechlorinating solution comprising glycerin as a pour point suppressant and thiosulfate pentahydrate as a reducing agent is mixed along with water. In one such Example discussed below, a dechlorinating solution is prepared containing about 70% glycerin, about 4.5% sodium thiosulfate pentahydrate, and about 25.5% water. In this Example, water activity is about 0.6 ($a_w$), as determined by a Decagon Devices Inc. Pawkit Portable Water Activity Meter. In another Example, a dechlorinating solution is prepared containing 70.0% glycerin, 0.8% sodium thiosulfate pentahydrate, 29.2% water. In these Examples, the dechlorinating solution is then applied to chlorinated water at ratio ranging from about 5-23 grams dechlorinating solution per 5 gallons of water. It is appreciated that other ranges can be used, and that these compositions can be combined with additional ingredients, as would be understood by the skilled artisan.

In certain implementations, the dechlorinating solution is prepared by performing several steps. In one step, preparing a stock solution of 15% sodium thiosulfate pentahydrate. In another step, combining the stock solution with glycerol at the rate of about 70% glycerin to about 30% of 15% sodium thiosulfate pentahydrate stock solution. It is understood that the glycerin and sodium thiosulfate pentahydrate stock solution are miscible, and that this formulation has a pour point of less than −12 C. It is further appreciated that the glycerol can also provide a sweetening taste to the water, which will also increase the palatability of the water for livestock.

In implementations using this preparation, the dechlorinating solution is combined with chlorinated drinking water and mixed for about at least one minute prior to allowing livestock to drink from the water. Accordingly, a typical dosage rate is about 5 grams per 5 gallons water with free chlorine less than or equal to 4 ppm (4 ppm is the typical upper limit of free chlorine allowed in municipal drinking water). The stoichiometry of this Example is depicted in Scheme 1.

Example 1. A dechlorinating solution containing about 70% glycerin, about 4.5% sodium thiosulfate pentahydrate, and about 25.5% water was prepared as described above. Thirty-five pounds of municipal drinking water was added to a 5 gallon pail. Using Hach Chlorine test strips the total chlorine was about 0.5 ppm and the free chlorine was about 0.0 ppm. 1.0 grams of Clorox Bleach (6% sodium hypochlorite) was added to the pail and stirred. The theoretical concentration of total chlorine was therefore about 4.2 ppm (0.5 ppm from water and 3.7 ppm from addition of sodium hypochlorite).

In this Example, the measured chlorine using Hach test strips was about 4 ppm for both total and free chlorine. The water also had a noticeable chlorine odor. 1.0 g of the glycerol/sodium thiosulfate (4.5% active sodium thiosulfate pentahydrate) solution was added to the pail containing the chlorinated water and stirred for about one minute. The water was retested for chlorine and the total chlorine was reduced to 2 ppm and the free chlorine was reduced to 0 ppm. An additional 1.5 g of glycerol/sodium thiosulfate solution was added to the water and stirred for about one minute, thereby bringing the total amount of 4.5% active sodium thiosulfate solution to 2.5 grams, or a molar ratio of about 1:2. The water was retested for chlorine and the total and free chlorine were both reduced to about 0 ppm. The water did not have a noticeable chlorine odor.

Example 2. A dechlorinating solution was prepared with the composition: 70.0% glycerin, 0.8% sodium thiosulfate pentahydrate, 29.2% water. It was prepared by adding to a flask 31.5 g glycerin, 2.4 g (15% sodium thiosulfate pentahydrate solution) and 11.1 g water. The solution was stirred vigorously for 30 seconds.

In this Example, 35 lbs. of municipal drinking water was added to a 5 gallon pail. Using Hach Chlorine test strips the total chlorine was about 0.5 ppm and the free chlorine was about 0.0 ppm. 1.0 grams of Clorox Bleach (6% sodium hypochlorite) was added to the pail and stirred. The theoretical concentration of total chlorine should be about 4.2 ppm (0.5 ppm from water and 3.7 ppm from addition of sodium hypochlorite). The measured chlorine using Hach test strips was about 4 ppm for both total and free chlorine. The water also had a noticeable chlorine odor.

In this Example, 8.0 g of the glycerol/sodium thiosulfate (0.8% active sodium thiosulfate pentahydrate) solution, having a water activity of about 0.57 9 ($a_w$) was added to the pail containing the chlorinated water and stirred for about one minute. The water was retested for chlorine and the total chlorine was reduced to 1 ppm and the free chlorine was reduced to 0 ppm. There was no noticeable chlorine odor in the solution. An additional 8.0 g of glycerol/sodium thiosulfate solution was added to the water and stirred for about one minute, thereby bringing the total to about 16 grams of 0.8% active sodium thiosulfate, or a final molar ration of about 1:2. The water was retested for chlorine and the total and free chlorine were both reduced to about 0 ppm. The water did not have a noticeable chlorine odor.

Example 3. Based on the observation that sulfur odor was present in older preparations of dechlorination solution, pH of aged dechlorinating solutions were analyzed. Their ages were between 3 weeks and 14 months. The fatty acid and ester value of the glycerin used in these experiments was between 0.3 and 0.5. The results were as follows:

| DECHLORINATION SOLUTION | |
|---|---|
| Sample Age | pH |
| 14 months | 5.5 |
| 5 months | 5.3 |
| 5 months (105F) | 5.3 |
| 4 months | 6.2 |
| 2 months | 7.2 |
| 3 weeks | 7.0 |

Based upon these data there was a clear time dependent pH decrease in the dechlorination solution. It also appeared that the pH drop stopped at about 5.3. The acidic pH also explained the evolution of sulfur smell. Subsequent lab experiments confirmed that if the dechlorination solution pH was decreased to about 4.5 a sulfur odor was detected within a few hours. Furthermore raising the pH of a 5.3 dechlorinating solution to 6.8 almost immediately eliminated the sulfur odor.

Based upon the above, it was hypothesized that the addition of a weak base to the product, such that the pH (after several months of storage) would not decrease below about 7.0, would eliminate the sulfur odor. To test this hypothesis, the following solution was prepared: 70.0% USP glycerin; 0.8% sodium thiosulfate pentahydrate; 0.2% trisodium citrate dihydrate; and 29.0% water. The freshly prepared solution of the foregoing had a pH of 8.3. After 3 days storage of this material at 105° F., the pH dropped to 7.2. After 5 days of storage, the pH was still 7.2. After six weeks of storage at 105° F., the pH was 6.8. After 76 weeks of storage at 105° F., the pH was 6.5 For the same formulation stored at ambient temperature, after 8 weeks of storage the pH was 7.1. After 76 weeks of storage at ambient temperature, the pH was 6.9.

Example 4. Exemplary dechlorination solutions were prepared according to the following formulas, where Trisodium Citrate Dihydrate=TSC.

| Formula 0.2% TSC |
|---|
| 0.2% trisodium citrate dihydrate |
| 0.8% sodium thiosulfate monohydrate |
| 29.0% water |
| 70.0% glycerol |

| Formula 0.5% TSC |
|---|
| 0.5% trisodium citrate dihydrate |
| 0.8% sodium thiosulfate monohydrate |
| 28.7% water |
| 70.0% glycerol |

| Formula 1.0% TSC |
|---|
| 1.0% trisodium citrate dihydrate |
| 0.8% sodium thiosulfate monohydrate |
| 28.2% water |
| 70.0% glycerol |

The solutions prepared according to the above formulas were stored at 1050 F for 54 days and pH was assessed after initial preparation and at the end of the 54 day trial period. Initial and final pH is shown in the table below.

|         | 105F Storage |         |         |
|---------|--------------|---------|---------|
| Formula | pH (Day 0)   | pH (Day 54) | pH (Day 160) |
| 0.0% TSC | 8.1 | 6.7 | 6.5 |
| 0.2% TSC | 8.4 | 6.8 | 6.7 |
| 0.5% TSC | 8.5 | 7   | 7.0 |
| 1.0% TSC | 8.5 | 7.2 | 7.2 |

Although the disclosure has been described with reference to preferred embodiments, persons skilled in the art will recognize that changes may be made in form and detail without departing from the spirit and scope of the disclosed apparatus, systems and methods.

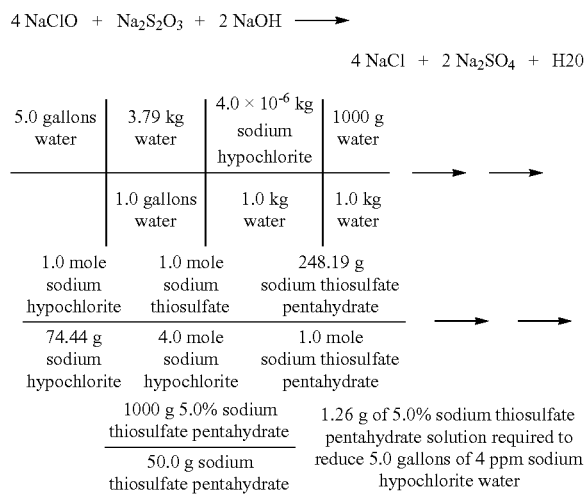

Scheme 1: Stoichiometry of reaction of sodium thiosulfate with sodium hypochlorite (typical chlorinating agent used in municipal drinking water). In this example about 1.26 g of solution, containing 5% sodium thiosulfate pentahydrate, is used to neutralize 5.0 gallons of water containing 4 ppm sodium hypochlorite.

What is claimed is:

1. A liquid composition for treatment of chlorinated liquid, comprising:
   a. a polyol, present in an amount from about 55% to about 85% of the composition volume;
   b. a reducing agent; and
   c. water.

2. The composition of claim 1, wherein the polyol is present in an amount from about 70% to about 80% of the composition volume.

3. The composition of claim 2, wherein the polyol has a fatty acid and ester content of about 0.5 or less.

4. The composition of claim 3, further comprising a weak base, wherein the weak base in present in an amount from about 0.3% to about 0.5%.

5. The composition of claim 4, comprising about 70% polyol, about 4.5% reducing agent, about 0.5% weak base, and about 25.0% water.

6. The composition of claim 1, comprising about 70% polyol, about 0.8% reducing agent, about 0.5% weak base, and about 28.7% water.

7. The composition of claim 4, wherein the weak base is chosen from one or more of sodium citrate, sodium tartrate, sodium lactate, sodium ascorbate, sodium malate, sodium benzoate, sodium sorbate, sodium propionate, and sodium phosphate.

8. The composition of claim 7, wherein the weak base is sodium citrate.

9. The composition of claim 8, wherein the sodium citrate is present from about 0.1% to about 1.0%.

10. The composition of claim 1, wherein the reducing agent is selected from a list consisting of sodium thiosulfate pentahydrate, potassium thiosulfate, calcium thiosulfate, magnesium thiosulfate, and salts of thiosulfuric acid.

11. The composition of claim 10, wherein the reducing agent is sodium thiosulfate pentahydrate.

12. The composition of claim 1, wherein the composition is flowable at −12 C.

13. The composition of claim 1, wherein the water activity of the composition is from about $0.5(a_w)$ to about $0.8(a_w)$.

14. The composition of claim 13, wherein the water activity of the composition is about $0.6(a_w)$.

15. A method of increasing livestock palatability for chlorinated water, comprising:
   a. providing a dechlorinating solution comprising pour point suppressant, a reducing agent, and water; and
   b. combining the dechlorinating solution with chlorinated water.

16. The method of claim 15, further comprising assessing the level chlorine in the chlorinated water by way of a test strip, following the addition of the dechlorinating solution and wherein chlorine is undetectable by the test strip following the addition of the dechlorinating solution.

17. The method of claim 15, wherein the molar ratio of the reducing agent to chlorine in the chlorinated water is about 1:2.

18. The method of claim 15, wherein the dechlorinating solution comprises pour point suppressant present in an amount from about 55% to about 85% of the composition volume.

19. The method of claim 15, wherein the dechlorinating solution comprises about 70% pour point suppressant, about 4.5% reducing agent, from about 0.1% to about 1.0% weak base, and from about 24.5 to about 25.4% water.

20. A liquid dechlorinating composition for increasing the livestock palatability of chlorinated water comprising:
   a. about 70% polyol, wherein the glycerin comprises 0.5 or less fatty acids and esters;
   b. about 0.8% sodium thiosulfate pentahydrate;
   c. about 0.5% sodium citrate; and
   d. about 25% water.

* * * * *